United States Patent
Wang (10) Patent No.: US 12,342,196 B2
(45) Date of Patent: Jun. 24, 2025

(54) MEASUREMENT METHOD AND APPARATUS, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 413 days.

(21) Appl. No.: 17/993,495

(22) Filed: Nov. 23, 2022

(65) Prior Publication Data

US 2023/0087417 A1 Mar. 23, 2023

Related U.S. Application Data

(63) Continuation of application No. PCT/CN2020/092702, filed on May 27, 2020.

(51) Int. Cl.
*H04W 24/08* (2009.01)
*H04W 24/10* (2009.01)
*H04W 36/00* (2009.01)

(52) U.S. Cl.
CPC ........... *H04W 24/08* (2013.01); *H04W 24/10* (2013.01); *H04W 36/0094* (2013.01)

(58) Field of Classification Search
CPC .... H04W 24/08; H04W 24/10; H04L 5/0094; H04L 5/0091

USPC ........................................................ 370/252
See application file for complete search history.

(56) References Cited

U.S. PATENT DOCUMENTS

| 2019/0097877 | A1 | 3/2019 | Yiu et al. | |
| 2019/0124533 | A1* | 4/2019 | Tenny | H04L 5/0091 |
| 2019/0174343 | A1* | 6/2019 | Cui | H04W 72/1268 |
| 2019/0253909 | A1* | 8/2019 | Yiu | H04W 72/0453 |

(Continued)

FOREIGN PATENT DOCUMENTS

| CN | 102752786 A | 10/2012 |
| CN | 109788497 A | 5/2019 |

(Continued)

OTHER PUBLICATIONS

Communication pursuant to Article 94(3) EPC for EP Application 20937560.9 mailed Nov. 14, 2023. (7 pages).

(Continued)

*Primary Examiner* — Jungwon Chang
(74) *Attorney, Agent, or Firm* — Young Basile Hanlon & MacFarlane, P.C.

(57) ABSTRACT

The embodiments of the present application provide a measurement method and apparatus, a terminal device, and a network device. The method comprises: a terminal device receives first instruction information sent by a network device, the first instruction information being used for instructing to activate a first measurement gap configuration; the terminal device determines frequency domain information associated with the first measurement gap configuration, and performs a measurement on the basis of a measurement configuration and the frequency domain information associated with the first measurement gap configuration.

17 Claims, 5 Drawing Sheets

--- receiving, by a terminal device, first indication information sent by a network device; the first indication information is configured to indicate to activate a first measurement gap configuration — 701 determining, by the terminal device, frequency domain information associated with the first measurement gap configuration, and performing, by the terminal device, a measurement based on a measurement configuration and the frequency domain information associated with the first measurement gap configuration — 702

(56) References Cited

U.S. PATENT DOCUMENTS

| | | | | |
|---|---|---|---|---|
| 2020/0288337 A1* | 9/2020 | Callender | ............. | H04W 24/10 |
| 2021/0345148 A1* | 11/2021 | Lin | ....................... | H04L 5/0094 |
| 2021/0368374 A1* | 11/2021 | Cheng | ................... | H04W 80/02 |
| 2024/0007258 A1* | 1/2024 | Yiu | ......................... | H04L 5/005 |

FOREIGN PATENT DOCUMENTS

| | | |
|---|---|---|
| CN | 111417131 A | 7/2020 |
| EP | 3295704 B1 | 5/2019 |
| WO | 2016182526 A1 | 11/2016 |
| WO | 2018227494 A1 | 12/2018 |
| WO | 2019137112 A1 | 7/2019 |

OTHER PUBLICATIONS

International Search Report and Written Opinion with English Translation for PCT Application PCT/CN2020/092702 mailed Feb. 18, 2021. (14 pages).

European Second Examination Report for European Patent Application No. 20937560.9, mailed Apr. 12, 2024, 4 pages.

Extended European Search Report for EP Application 20937560.9 mailed May 11, 2023. (11 pages).

Chinese Request for Priority Examination of Patent Application, Chinese Application No. 202310575549.2, mailed Jul. 16, 2024, 5 pages.

Chinese First Office Action, Chinese Application No. 202310575549.2, mailed Aug. 26, 2024, 18 pages.

Chinese Second Office Action with English translation, for Chinese Application No. 202310575549.2, mailed Nov. 12, 2024, 16 pages.

* cited by examiner

FIG. 12

MEASUREMENT METHOD AND APPARATUS, TERMINAL DEVICE, AND NETWORK DEVICE

CROSS-REFERENCE TO RELATED APPLICATION(S)

The present application is a continuation-application of International (PCT) Patent Application No. PCT/CN2020/092702, filed on May 27, 2020, the entire contents of which are hereby incorporated by reference in its entirety.

TECHNICAL FIELD

The present disclosure relates to the field of mobile communication technologies, and in particular to a measurement method, an apparatus, a terminal device, and a network device.

BACKGROUND

The purpose of a measurement gap (MG) is that the terminal device can leave the current service cell during the measurement gap and perform a measurement on a target cell. Currently, the measurement gap configured on the network side lacks flexibility to balance the effectiveness of measurement with the impact of reduced throughput.

SUMMARY

The present disclosure provides a measurement method, an apparatus, a terminal device, and a network device.

Embodiments of the present disclosure provides a measurement method, including:
  receiving, by a terminal device, first indication information sent by a network device; wherein the first indication information is configured to indicate to activate a first measurement gap configuration; and
  determining, by the terminal device, frequency domain information associated with the first measurement gap configuration, and performing, by the terminal device, a measurement based on a measurement configuration and the frequency domain information associated with the first measurement gap configuration.

Embodiments of the present disclosure provides a measurement method, including:
  sending, by a network device, first indication information to a terminal device; wherein the first indication information is configured to indicate to activate a first measurement gap configuration, and the first measurement gap configuration is configured for the terminal device to perform a measurement based on a measurement configuration and a frequency domain information associated with the first measurement gap configuration.

Embodiments of the present disclosure provides a measurement apparatus, applied to a terminal device and including:
  a receiving unit, configured to receive first indication information sent by a network device; wherein the first indication information is configured to indicate to activate a first measurement gap configuration;
  a determining unit, configured to determine frequency domain information associated with the first measurement gap configuration; and
  a measurement unit, configured to perform a measurement based on a measurement configuration and the frequency domain information associated with the first measurement gap configuration.

Embodiments of the present disclosure provides a measurement apparatus, applied to a network device and including:
  a sending unit, configured to send first indication information to a terminal device; wherein the first indication information is configured to indicate to activate a first measurement gap configuration, and the first measurement gap configuration is configured for the terminal device to perform a measurement based on a measurement configuration and a frequency domain information associated with the first measurement gap configuration.

Embodiments of the present disclosure provides a terminal device, including a processor and a memory; wherein the memory is configured to store a computer program, and the processor is configured to call and run the computer program stored in the memory to perform the above measurement method.

Embodiments of the present disclosure provides a network device, including a processor and a memory; wherein the memory is configured to store a computer program, and the processor is configured to call and run the computer program stored in the memory to perform the above measurement method.

Embodiments of the present disclosure provides a chip for perform the above measurement method.

Specifically, the chip includes a processor configured to call and run a computer program for causing a device arranged with the chip to perform the above measurement method.

Embodiments of the present disclosure provides a computer-readable storage medium, configured to store a computer program; wherein the computer program is capable of causing a computer to perform the above measurement method.

Embodiments of the present disclosure provides a computer program product, including a computer program instruction; wherein the computer program instruction is capable of causing a computer to perform the above measurement method.

Embodiments of the present disclosure provides a computer program, capable of causing a computer to perform the above measurement method.

With the above technical solution, the network side dynamically changes the measurement gap configuration on the terminal device side according to the measurement demand by the first indication information, and since each measurement gap configuration is associated with the frequency domain information, the terminal device can dynamically change the measurement object based on the dynamically changed measurement gap configuration, such that the measurement may be carried out efficiently while making the impact of the measurement gap on throughput as small as possible.

BRIEF DESCRIPTION OF DRAWINGS

The drawings described here are intended to provide a further understanding of the present disclosure and constitute a part of the present disclosure. The exemplary embodiments and descriptions of the present disclosure are intended to explain the present disclosure, and do not constitute an improper limitation of the present disclosure.

DETAILED DESCRIPTION

The technical solutions in the embodiments of the present disclosure will be described below in conjunction with the accompanying drawings in the embodiments of the present disclosure. Obviously, the embodiments described are a part of the embodiments of the present disclosure, and not all of them. With respect to the embodiments in the present disclosure, all other embodiments obtained by those skilled in the art without making creative labor fall within the scope of the present disclosure.

The technical solutions of the embodiments of the present disclosure may be applied to various communication systems, such as: long term evolution (LTE) system, LTE frequency division duplex (FDD) system, LTE time division duplex (TDD) system, 5G communication system or future communication systems, etc.

Figure 1:
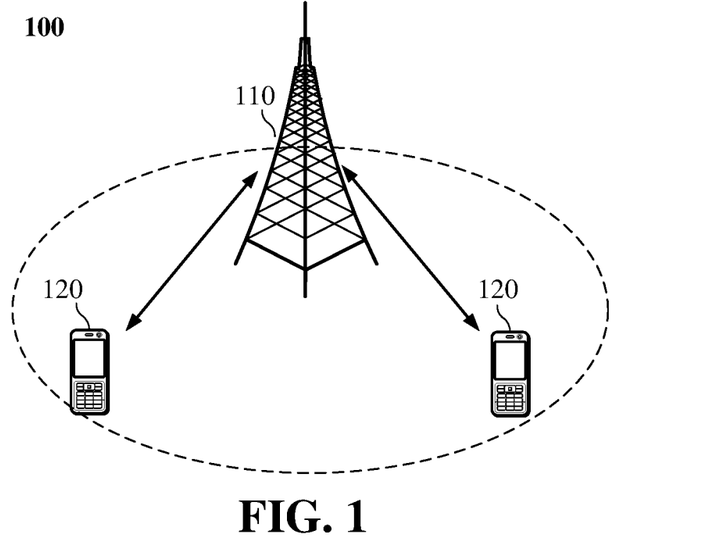
FIG. 1 is a schematic view of a communication system architecture according to an embodiment of the present disclosure.

Exemplarily, a communication system 100 applied in the embodiments of the present disclosure is shown in FIG. 1. The communication system 100 may include a network device 110, and the network device 110 may communicate with a terminal 120 (or called a communication terminal or terminal). The network device 110 may provide communication coverage for a specific geographic region and may communicate with terminals located in the coverage region. In some embodiments, the network device 110 may be an evolved base station (evolutional Node B, eNB or eNodeB) in an LTE system, or a wireless controller in a cloud radio access network (CRAN), or the network device may be a mobile switching center, a relay station, an access point, an in-vehicle device, a wearable device, a hub, a switch, a bridge, a router, a network side device in a 5G network, or a network device in a future communication system, etc.

The communication system 100 further includes at least one terminal 120 located within the coverage region of the network device 110. The term "terminal" herein includes, but is not limited to, a device configured to receive/send communication signals, connected through wired lines, such as public switched telephone network (PSTN), digital subscriber line (DSL), digital cable, and direct cable connections; and/or through another data connection/network; and/or through a wireless interface, such as for cellular network, wireless local region network (WLAN), digital TV network such as DVB-H network, satellite networks, AM-FM A broadcast transmitter; and/or through another terminal; and/or an Internet of Things (IoT) device. A terminal configured to communicate through a wireless interface may be referred to as a "wireless communication terminal", a "wireless terminal" or a "mobile terminal". Examples of mobile terminals include, but are not limited to, satellite or cellular phones; personal communications system (PCS) terminals that can combine cellular radio phones with data processing, fax, and data communication capabilities; PDAs that may include a radio phone, pager, Internet/Intranet access, Web browser, notepad, calendar, and/or global positioning system (GPS) receiver; and conventional laptop and/or handheld receivers or other electronic devices including radiotelephone transceivers. The terminal may refer to access terminal, user equipment (UE), user unit, user station, mobile station, mobile platform, remote station, remote terminal, mobile device, user terminal, terminal, wireless communication device, user agent, or user apparatus. The access terminal may be a cellular phone, a cordless phone, a session initiation protocol (SIP) phone, a wireless local loop (WLL) station, a personal digital assistant (PDA), a handheld device with wireless communication capabilities, a computing device or other processing devices connected to wireless modems, an in-vehicle device, a wearable device, a terminal in 5G networks or terminals in future evolved PLMNs, etc.

In some embodiments, the terminals 120 can communicate with each other with direct terminal connection (Device to Device, D2D).

In some embodiments, the 5G communication system or 5G network may also be referred to as a new radio (NR) system or NR network.

FIG. 1 exemplarily illustrates a network device and two terminals. In some embodiments, the communication system 100 may include multiple network devices and the coverage of each network device may include other numbers of terminals, which is not limited herein.

In some embodiments, the communication system 100 may further include other network entities such as a network controller and a mobility management entity, which is not limited herein.

It should be understood that a device with a communication function in the network/system in the embodiments of the present disclosure may be referred to as a communication device. Taking the communication system 100 shown in FIG. 1 as an example, the communication device may include a network device 110 and terminals 120 with communication functions. The network device 110 and the terminals 120 may be the specific devices described above, which will not be repeated here. The communication device may further include other devices in the communication system 100, such as other network entities such as a network controller and a mobility management entity, which is not limited herein.

It should be understood that the terms "system" and "network" in the present disclosure are often used interchangeably. The term "and/or" is only an association relationship that describes the associated objects, which means that there can be three relationships. For example, A and/or B may mean: the existence of A alone, the existence of both A and B, and the existence of B alone. In addition, the character "/" generally indicates that the front and back associated objects are in an "or" relationship.

In order to facilitate the understanding of the technical solutions of the embodiments of the present disclosure, the technical solutions related to the embodiments of the present disclosure are described below.

With people's pursuit of speed, latency, high-speed mobility, energy efficiency, and the diversity and complexity of services in future life, the 3rd generation partnership project (3GPP) international standards organization has begun to develop 5G. The main application scenarios of 5G are: enhanced mobile broadband (eMBB), ultra reliable low latency communication (URLLC), and massive machine type communication (mMTC).

On the one hand, eMBB still aims at users' access to multimedia content, services and data, and its demand is growing very fast. On the other hand, since eMBB may be deployed in different scenarios, such as indoor, urban, rural, etc., its capabilities and demands vary widely, and it therefore cannot be generalized and must be analyzed in detail with specific deployment scenarios. Typical applications of URLLC include: industrial automation, power automation, telemedicine operation (surgery), traffic safety and security, etc. Typical features of mMTC include: high connection density, small data volume, latency-insensitive services, low cost of modules, long lifetime, etc.

In the early deployment of NR, complete NR coverage was difficult to obtain, so the typical network coverage was a wide-region LTE coverage mode and a NR siloed coverage mode. In addition, a large number of LTE deployments were below 6 GHz, with very little sub-6 GHz spectrum available for 5G. Therefore, researched shall be made for the NR application of spectrum above 6 GHz, while the high frequency-band has limited coverage and fast signal fading. Moreover, in order to protect the mobile operators' investment in LTE in the early stage, a working mode of close cooperation between LTE and NR (tight interworking) was proposed.

Figure 2:
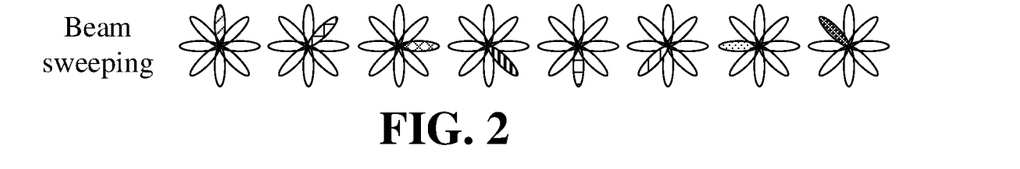
FIG. 2 is a schematic view of a Beam sweeping according to an embodiment of the present disclosure.
Figure 3:
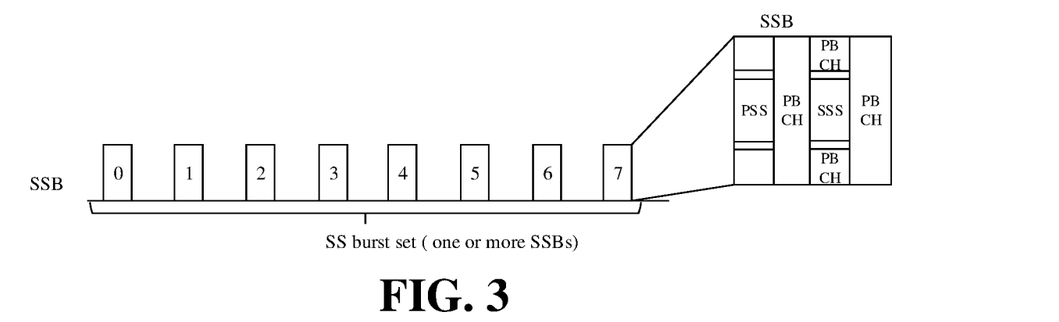
FIG. 3 is a schematic view of a SSB according to an embodiment of the present disclosure.
Figure 4:
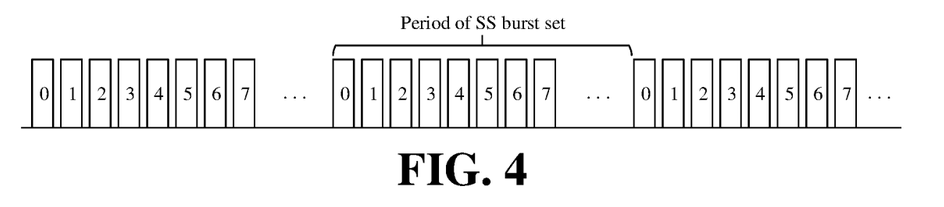
FIG. 4 is a schematic view of a SSB burst set period according to an embodiment of the present disclosure.

NR can also be deployed independently. NR will be deployed at high frequencies in the future, and in order to improve coverage, the coverage requirement is met in 5G by introducing a beam sweeping mechanism (space for coverage, time for space), as shown in FIG. 2. After the introduction of beam sweeping, synchronization signals are required to be sent in each beam direction. The synchronization signal of 5G is given as a synchronisation signal block (SS/PBCH block, SSB), which includes primary synchronisation signal (PSS), secondary synchronisation signal (SSS), and physical broadcast channel (PBCH), as shown in FIG. 3. The synchronization signal of 5G appears periodically in the time domain in the form of a SS burst set, as shown in FIG. 4.

The actual number of beams transmitted per cell is determined by the network side configuration, but the frequency point where the cell is located determines the maximum number of beams that can be configured, as shown in Table 1 below.

TABLE 1

| Frequency range | L (max. number of beams) |
|---|---|
| up to 3 (2.4) GHz | 4 |
| 3 (2.4) GHz-6 GHz | 8 |
| 6 GHz-52.6 GHz | 64 |

In radio resource management (RRM) measurements, the measurement signal may be an SSB measurement, i.e., the SSS signal in the SSB or the demodulation reference signal (DMRS) of the PBCH is measured to obtain a beam measurement result and a cell measurement result. In addition, the terminal device in radio resource control (RRC) connection may be further configured with a channel status indicator reference signal (CSI-RS) as the reference signal for cell measurement.

Figure 5:
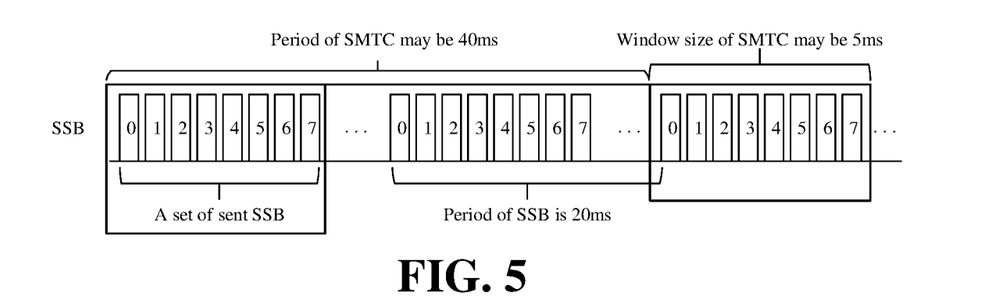
FIG. 5 is a schematic view of a SMTC according to an embodiment of the present disclosure.

For SSB-based measurements, the actual transmission location of SSBs in each cell may be different, and the SS burst set period may also be different. Therefore, in order to make the terminal device save energy during the measurement process, the network side configures a SSB measurement timing configuration (SS/PBCH block measurement timing configuration, SMTC) for the terminal device, and the terminal device only needs to measure within the SMTC window, as shown in FIG. 5.

Since the actual transmission location of SSBs in each cell may be different, in order to enable the terminal device to find the actual transmission location of SSBs as soon as possible, the network may further configure the actual SSB transmission location measured by UE to the terminal device, for example, a concatenation of the actual transmission location of SSBs in all measurement cells. For example, at 3-6 GHz, the network side indicates a bitmap: 10100110, through which the terminal device is informed to do measurement only for SSBs with SSB index of 0, 2, 5, 6 among the candidate locations of 8 SSBs.

The RRM is divided into two types: intra-frequency measurement and inter-frequency measurement. For inter-frequency measurement, a measurement gap configuration may be required. With reference to Table 2 below, the measurement gap configuration includes the following information: measurement gap period (measurement gap repetition period, MGRP), measurement gap offset (GapOffset), measurement gap duration (measurement gap length, MGL), timing reference (measurement gap timing advance, MGTA), etc.

TABLE 2

```
GapConfig ::=            SEQUENCE {
    gapOffset                INTEGER (0..159) ,
    mgl                      ENUMERATED (ms1dot5, ms3, ms3dot5, ms4, ms5dot5, ms6),
    mgrp                     ENUMERATED (ms20, ms40, ms80, ms160),
    mgta                     ENUMERATED (ms0, ms0dot25, ms0dot5),
    ...,
    [[
    refServCellIndicator                                ENUMERATED (pCell, pSCell, mcg-FR2)
    OPTIONAL    -- Cond NEDCorNRDC
    ]]
}
```

Figure 6:
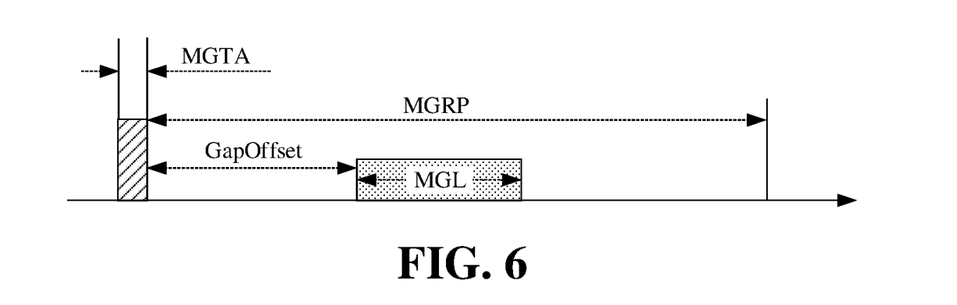
FIG. 6 is a schematic view of a measurement gap according to an embodiment of the present disclosure.

The individual information in the measurement gap configuration may be illustrated with reference to FIG. 6, where MGRP represents the period of the measurement gap repetition, GapOffset represents an offset of a starting position of the measurement gap relative to a starting position of a MGRP, MGL represents the duration of the measurement gap, and MGTA is configured to determine the timing of the measurement gap.

There are various types of measurement gaps, and configurations of 24 measurement gap patterns are given in Table 3 below. It should be noted that the description of "gap pattern" in the present disclosure may be replaced by "measurement gap", and similarly, the description of "measurement gap" may be replaced by "measurement gap pattern".

TABLE 3

| Identity of measurement gap pattern | MGL, ms | MGRP, ms |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

Each measurement gap is different for the measured target frequency points. For example, a measurement gap of 3 ms length may be insufficient for measuring LTE frequency points because synchronization signals (such as PSS and SSS) need 5 ms to be fully synchronized in LTE. For a measurement gap of 6 ms length, many types of target frequency points can be measured, such as LTE cells, NR cells, etc., but a measurement gap of 6 ms length may reduce throughput. For this reason, the following technical solution of the present disclosure is proposed. In the technical solution, the network side dynamically adjusts the use of the measurement gap for the terminal device according to measurement requirements (e.g., the type of target frequency point), such that the impact of the measurement gap on the throughput may be reduced as much as possible while taking into account that the measurement is performed efficiently.

Figure 7:
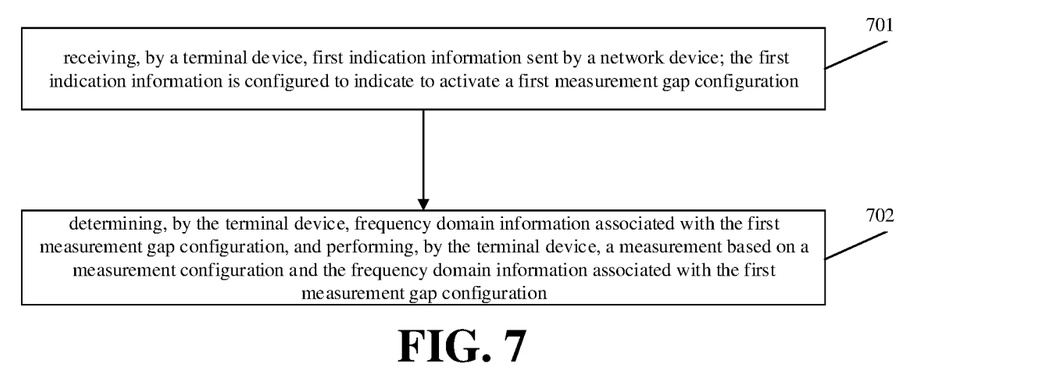
FIG. 7 is a flowchart of a measurement method according to an embodiment of the present disclosure.

FIG. 7 is a flowchart of a measurement method according to an embodiment of the present disclosure. The measurement method includes the following steps at blocks illustrated in FIG. 7.

At block 701: receiving, by a terminal device, first indication information sent by a network device; the first indication information is configured to indicate to activate a first measurement gap configuration.

In the embodiments of the present disclosure, the network device sends the first indication information to the terminal device, and correspondingly, the terminal device receives the first indication information sent by the network device. The first indication information is configured to indicate the activation of the first measurement gap configuration. In some embodiments, the network device is a base station, such as a gNB.

In some embodiments, the first indication information is carried in a radio resource control (RRC) signaling. For example, the network device sends the first indication information to the terminal device through the RRC signaling (such as an RRC configuration message or an RRC reconfiguration message), where the first indication information is configured to indicate the first measurement gap configuration that is initially activated. After receiving the RRC signaling, the terminal device activates the first measurement gap configuration according to the first indication information and performs a measurement based on the first measurement gap configuration.

In other embodiments, the first indication information is carried in a media access control control element (MAC CE) or a physical downlink control channel (PDCCH). For example, the network device sends the first indication information to the terminal device through the MAC CE or PDCCH, where the first indication information is configured to indicate the dynamically changed first measurement gap configuration. After receiving the MAC CE or PDCCH, the terminal device deactivates the original measurement gap configuration, activates the first measurement gap configuration indicated by the first indication information, and performs a measurement based on the first measurement gap configuration. It should be noted that the network side may flexibly and dynamically adjust the measurement gap configuration that the terminal device needs to activate through the MAC CE or PDCCH according to measurement requirements.

In the embodiments of the present disclosure, the first indication information may be a measurement gap index (Gap index) or a measurement gap pattern identity corresponding to the first measurement gap configuration.

At block 702: determining, by the terminal device, frequency domain information associated with the first measurement gap configuration, and performing, by the terminal device, a measurement based on a measurement configuration and the frequency domain information associated with the first measurement gap configuration.

In the embodiments of the present disclosure, after receiving the first indication information, the terminal device may select a suitable measurement object (or measurement range) for measurement according to the activated first measurement gap configuration indicated by the first indication information.

To this end, the embodiments of the present disclosure establish an association relationship between the measurement gap configuration and the frequency domain information, and determines which measurement object or objects need to be measured by determining whether each measurement object matches the frequency domain information associated with the measurement gap configuration.

In some embodiments, the network device sends first configuration information to the terminal device, and correspondingly, the terminal device receives the first configuration information sent by the network device. The first configuration information is configured to determine at least one measurement gap configuration. Each of the at least one measurement gap configuration is associated with a set of frequency domain information.

In an example, the content of the first configuration information may be as shown in Table 2. For each measurement gap configuration, in addition to including MGRP, MGL and other information, each measurement gap configuration further includes the frequency domain information for measurement.

In some embodiments, the frequency domain information includes at least one of the following.

Frequency point type, frequency point list, frequency point and physical cell identity (PCI) list, frequency band list, measurement object identity list.

In the above solution, the frequency point type may refer to the radio access technology (RAT) of the frequency point, and different frequency point types are for different RAT frequency points, such as LTE frequency point, NR frequency point, UTRAN frequency point, etc. In other embodiments, the frequency point type may refer to a frequency range (FR), and different frequency point types correspond to different FR frequency points, such as FR1 frequency point, FR2 frequency point, etc.

In the above solution, the frequency point list may include identity information of one or more frequency points (for example, frequency point numbers).

In the above solution, the frequency point and the PCI list (i.e., "frequency point+PCI" list) are configured to determine a cell list. Each cell in the cell list is identified by a frequency point and a PCI (i.e., frequency point+PCI).

In the above solution, the frequency band list includes identity information of one or more bands (for example, band numbers).

In the above solution, the measurement object identity list includes one or more measurement object identities.

The following describes how the terminal device performs measurement based on the measurement configuration and the frequency domain information associated with the first measurement gap configuration.

In some embodiments, the terminal device determines whether the frequency point type corresponding to the measurement object is consistent with the frequency point type associated with the first measurement gap configuration according to the measurement object identity associated with the measurement identity in the measurement configuration; and the terminal device performs a measurement on the measurement object based on the first measurement gap configuration, in response to the frequency point type corresponding to the measurement object being consistent with the frequency point type associated with the first measurement gap configuration.

For example, the measurement configuration includes a measurement identity (id) 1, a measurement id 2, and a measurement id 3. The measurement id 1 is associated with a measurement object id 1 (where frequency point type is LTE frequency point), the measurement id 2 is associated with a measurement object id 2 (where frequency point type is NR frequency point), and the measurement id 3 is associated with a measurement object id 3 (where frequency point type is UTRAN frequency point). The frequency point type associated with the first measurement gap configuration is an NR frequency point, and the terminal device uses the first measurement gap configuration to perform measurement on the measurement object indicated by the measurement object id 2.

In some embodiments, the terminal device determines whether the frequency point corresponding to the measurement object belongs to the frequency point list associated with the first measurement gap configuration according to the measurement object identity associated with the measurement identity in the measurement configuration; the terminal device performs a measurement on the measurement object based on the first measurement gap configuration, in response to the frequency point corresponding to the measurement object belonging to the frequency point list associated with the first measurement gap configuration.

For example, the measurement configuration includes a measurement id 1, a measurement id 2, and a measurement id 3. The measurement id 1 is associated with a measurement object id 1 (corresponding to frequency point 1), the measurement id 2 is associated with a measurement object id 2 (corresponding to frequency point 2), and the measurement id 3 is associated with a measurement object id 3 (corresponding to frequency point 3). The frequency point list associated with the first measurement gap configuration includes frequency point 1 and frequency point 2, and the terminal device uses the first measurement gap configuration to perform measurement on the measurement object indicated by the measurement object id 1 and the measurement object id 2.

In some embodiments, the terminal device determines whether the cell corresponding to the measurement object belongs to the frequency point and PCI list associated with the first measurement gap configuration according to the measurement object identity associated with the measurement identity in the measurement configuration; the terminal device performs a measurement on the measurement object based on the first measurement gap configuration, in response to the cell corresponding to the measurement object belonging to the frequency point and PCI list associated with the first measurement gap configuration.

For example, the measurement configuration includes a measurement id 1, a measurement id 2, and a measurement id 3. The measurement id 1 is associated with a measurement object id 1 (corresponding to a cell 1), the measurement id 2 is associated with a measurement object id 2 (corresponding to a cell 2), and the measurement id 3 is associated with a measurement object id 3 (corresponding to a cell 3). The frequency point and PCI list associated with the first measurement gap configuration includes frequency point 1+PCI 1 (corresponding to the cell 1), and the terminal device uses the first measurement gap configuration to perform measurement on the measurement object indicated by the measurement object id 1.

In some embodiments, the terminal device determines whether the frequency band in which the frequency point corresponding to the measurement object is located belongs to the frequency band list associated with the first measurement gap configuration according to the measurement object identity associated with the measurement identity in the measurement configuration; the terminal device performs a measurement on the measurement object based on the first measurement gap configuration, in response to the frequency band in which the frequency point corresponding to the measurement object is located belonging to the frequency band list associated with the first measurement gap configuration.

For example, the measurement configuration includes a measurement id 1, a measurement id 2, and a measurement id 3. The measurement id 1 is associated with a measurement object id 1 (corresponding to a frequency band 1), the measurement id 2 is associated with a measurement object id 2 (corresponding to a frequency band 2), and the measurement id 3 is associated with a measurement object id 3 (corresponding to a frequency band 3). The frequency band list associated with the first measurement gap configuration includes the frequency band 3, and the terminal device uses the first measurement gap configuration to perform measurement on the measurement object indicated by the measurement object id 3.

In some embodiments, the terminal device determines whether the measurement object identity belongs to the measurement object identity list associated with the first measurement gap configuration according to the measurement object identity associated with the measurement identity in the measurement configuration; the terminal device performs a measurement on the measurement object based on the first measurement gap configuration, in response to the measurement object identity belonging to the measurement object identity list associated with the first measurement gap configuration.

For example, the measurement configuration includes a measurement id 1, a measurement id 2, and a measurement id 3. The measurement id 1 is associated with a measurement object id 1, the measurement id 2 is associated with a measurement object id 2, and the measurement id 3 is associated with a measurement object id 3. The measurement object identity list associated with the first measurement gap configuration includes the measurement object id 2 and the measurement object id 3, and the terminal device uses the first measurement gap configuration to perform measurement on the measurement object indicated by the measurement object id 2 and the measurement object id 3.

In the technical solution of the embodiments of the present disclosure, the network side dynamically changes the measurement gap configuration on the terminal device side through the first indication information according to the measurement requirements. Since each measurement gap configuration is associated with frequency domain information, the terminal device may dynamically change the measurement object based on the dynamically changing measurement gap configuration, such that the measurement may be performed efficiently while keeping the impact of the measurement gap on the throughput as small as possible.

Figure 8:
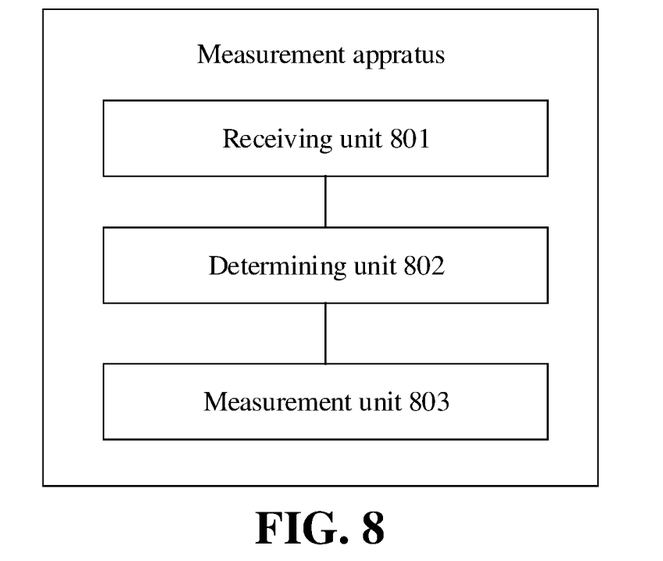
FIG. 8 is a schematic view of a structural composition of a measurement apparatus according to an embodiment of the present disclosure.

FIG. 8 is a schematic view of a structural composition of a measurement apparatus according to an embodiment of the present disclosure. The measurement apparatus is applied to a terminal device. As shown in FIG. 8, the measurement device includes components as followed.

A receiving unit 801, configured to receive first indication information sent by a network device; the first indication information is configured to indicate to activate a first measurement gap configuration.

A determining unit 802, configured to determine frequency domain information associated with the first measurement gap configuration.

A measurement unit 803, configured to perform a measurement based on a measurement configuration and the frequency domain information associated with the first measurement gap configuration.

In some embodiments, the first indication information is carried in a RRC signaling or a MAC CE or a PDCCH.

In some embodiments, the first indication information is a measurement gap index or a measurement gap pattern identity corresponding to the first measurement gap configuration.

In some embodiments, the receiving unit 801 is further configured to receive first configuration information sent by the network device, and the first configuration information is configured to determine at least one measurement gap configuration; each of the at least one measurement gap configuration is associated with a set of frequency domain information.

In some embodiments, the frequency domain information includes at least one of the following.

Frequency point type, frequency point list, frequency point and physical cell identity (PCI) list, frequency band list, measurement object identity list.

In some embodiments, the determining unit 802 is configured to determine whether the frequency point type corresponding to the measurement object is consistent with the frequency point type associated with the first measurement gap configuration according to the measurement object identity associated with the measurement identity in the measurement configuration.

The measurement unit 803 is configured to perform a measurement on the measurement object based on the first measurement gap configuration, in response to the frequency point type corresponding to the measurement object being consistent with the frequency point type associated with the first measurement gap configuration.

In some embodiments, the determining unit 802 is configured to determine whether the frequency point corresponding to the measurement object belongs to the frequency point list associated with the first measurement gap configuration according to the measurement object identity associated with the measurement identity in the measurement configuration.

The measurement unit 803 is configured to perform a measurement on the measurement object based on the first measurement gap configuration, in response to the frequency point corresponding to the measurement object belonging to the frequency point list associated with the first measurement gap configuration.

In some embodiments, the determining unit 802 is configured to determine whether the cell corresponding to the measurement object belongs to the frequency point and PCI list associated with the first measurement gap configuration according to the measurement object identity associated with the measurement identity in the measurement configuration.

The measurement unit 803 is configured to perform a measurement on the measurement object based on the first measurement gap configuration, in response to the cell corresponding to the measurement object belonging to the frequency point and PCI list associated with the first measurement gap configuration.

In some embodiments, the determining unit 802 is configured to determine whether the frequency band in which the frequency point corresponding to the measurement object is located belongs to the frequency band list associated with the first measurement gap configuration according to the measurement object identity associated with the measurement identity in the measurement configuration.

The measurement unit 803 is configured to perform a measurement on the measurement object based on the first measurement gap configuration, in response to the frequency band in which the frequency point corresponding to the measurement object is located belonging to the frequency band list associated with the first measurement gap configuration.

In some embodiments, the determining unit 802 is configured to determine whether the measurement object identity belongs to the measurement object identity list associated with the first measurement gap configuration according to the measurement object identity associated with the measurement identity in the measurement configuration.

The measurement unit 803 is configured to perform a measurement on the measurement object based on the first measurement gap configuration, in response to the measurement object identity belonging to the measurement object identity list associated with the first measurement gap configuration.

Those skilled in the art should understand that the relevant description of the above-mentioned measurement apparatus in the embodiments of the present disclosure can be understood with reference to the relevant description of the measurement method in the embodiments of the present disclosure.

Figure 9:
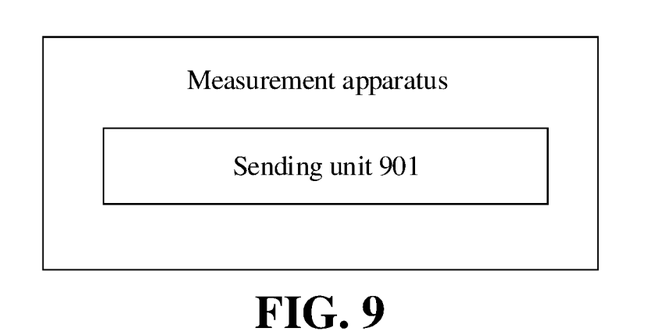
FIG. 9 is another schematic view of a structural composition of a measurement apparatus according to an embodiment of the present disclosure.

FIG. 9 is another schematic view of a structural composition of a measurement apparatus according to an embodiment of the present disclosure. The measurement apparatus is applied to a network device. As shown in FIG. 9, the measurement apparatus includes components as followed.

A sending unit 901, configured to send first indication information to a terminal device, the first indication information is configured to indicate to activate a first measurement gap configuration; the first measurement gap configuration is configured for the terminal device to perform a measurement based on a measurement configuration and a frequency domain information associated with the first measurement gap configuration.

In some embodiments, the first indication information is carried in a RRC signaling or a MAC CE or a PDCCH.

In some embodiments, the first indication information is a measurement gap index or a measurement gap pattern identity corresponding to the first measurement gap configuration.

In some embodiments, the sending unit 901 is further configured to send first configuration information to the terminal device; the first configuration information is configured to determine at least one measurement gap configuration; each of the at least one measurement gap configuration is associated with a set of frequency domain information.

In some embodiments, the frequency domain information includes at least one of the following.

Frequency point type, frequency point list, frequency point and PCI list, frequency band list, measurement object identity list.

Those skilled in the art should understand that the relevant description of the above-mentioned measurement apparatus in the embodiments of the present disclosure can be understood with reference to the relevant description of the measurement method in the embodiments of the present disclosure.

Figure 10:
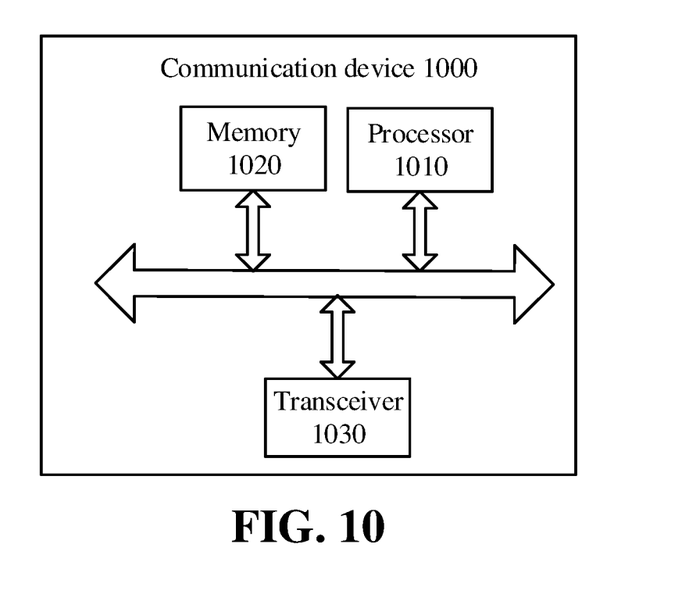
FIG. 10 is a structural schematic view of a communication device according to an embodiment of the present disclosure.

FIG. 10 is a structural schematic view of a communication device 1000 according to an embodiment of the present disclosure. The communication device may be a terminal device or a network device. The communication device 1000 shown in FIG. 10 includes a processor 1010. The processor 1010 can call and run a computer program from a memory to implement the method in the embodiments of the present disclosure.

In some embodiments, as shown in FIG. 10, the communication device 1000 may further include a memory 1020. The processor 1010 can call and run a computer program from the memory 1020 to implement the method in the embodiments of the present disclosure.

The memory 1020 may be a separate component independent of the processor 1010, or may be integrated in the processor 1010.

In some embodiments, as shown in FIG. 10, the communication device 1000 may further include a transceiver 1030, and the processor 1010 may control the transceiver 1030 to communicate with other devices. Specifically, the transceiver 1030 may send information or data to other devices, or receive send information or data sent by other devices.

The transceiver 1030 may include a transmitter and a receiver. The transceiver 1030 may further include an antenna, and the number of antennas may be one or more.

In some embodiments, the communication device 1000 may specifically be a network device in the embodiments of the present disclosure, and the communication device 1000 may implement the corresponding processes implemented by the network device in each of the methods of the embodiments of the present disclosure, which will not be repeated here for the sake of brevity.

In some embodiments, the communication device 1000 may specifically be a mobile terminal/terminal device in the embodiments of the present disclosure, and the communication device 1000 may implement the corresponding process implemented by the mobile terminal/terminal device in each of the methods of the embodiments of the present disclosure, which will not be repeated here for the sake of brevity.

Figure 11:
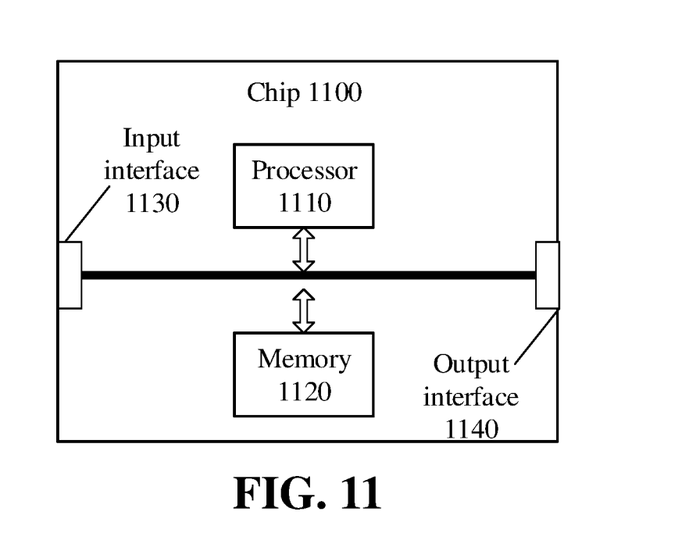
FIG. 11 is a structural schematic view of a chip according to an embodiment of the present disclosure.

FIG. 11 is a structural schematic view of a chip according to an embodiment of the present disclosure. The chip 1100 shown in FIG. 11 includes a processor 1110, and the processor 1110 can call and run a computer program from a memory to implement the method in the embodiments of the present disclosure.

In some embodiments, as shown in FIG. 11, the chip 1100 may further include a memory 1120. The processor 1110 can call and run a computer program from the memory 1120 to implement the method in the embodiments of the present disclosure.

The memory 1120 may be a separate component independent of the processor 1110, or may be integrated in the processor 1110.

In some embodiments, the chip 1100 may further include an input interface 1130. The processor 1110 can control the input interface 1130 to communicate with other devices or chips, and specifically, can obtain information or data sent by other devices or chips.

In some embodiments, the chip 1100 may further include an output interface 1140. The processor 1110 can control the output interface 1140 to communicate with other devices or chips, and specifically, can output information or data to other devices or chips.

In some embodiments, the chip may be applied to the network device in the embodiments of the present disclosure, and the chip can implement the corresponding processes implemented by the network device in each of the methods of the embodiments of the present disclosure, which will not be repeated here for the sake of brevity.

In some embodiments, the chip may be applied to the mobile terminal/terminal device in the embodiment of the present disclosure, and the chip can implement the corresponding process implemented by the mobile terminal/terminal device in each of the methods of the embodiments of the present disclosure, which will not be repeated here for the sake of brevity.

It should be understood that the chip mentioned in the embodiments of the present disclosure may also be called a system-level chip, system chip, chip system or system-on chip, etc.

Figure 12:
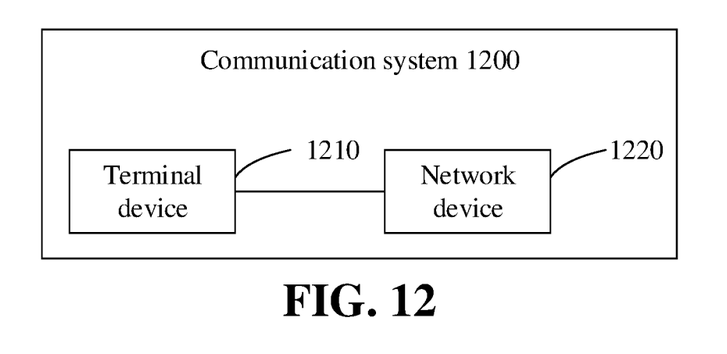
FIG. 12 is a schematic block view of a communication system according to an embodiment of the present disclosure.

FIG. 12 is a schematic block view of a communication system 1200 according to an embodiment of the present disclosure. As shown in FIG. 12, the communication system 1200 includes a terminal device 1210 and a network device 1220.

The terminal device 1210 may be configured to implement the corresponding function implemented by the terminal device in the above method, and the network device 1220 may be configured to implement the corresponding function implemented by the network device in the above method. For brevity, it will not be repeated herein.

It is to be understood that the processor of the embodiments of the present disclosure may be an integrated circuit chip having the processing capability of signals. In the process of implementation, the steps of the above method embodiments may be accomplished by integrated logic circuitry in the hardware of the processor or instructions in the form of software. The above processor may be a general-purpose processor, a digital signal processor (DSP), an application specific integrated circuit (ASIC), a field programmable gate array (FPGA) or other programmable logic device, discrete gate or transistor logic device, or discrete hardware component. The respective methods, steps, and logic block diagrams in the embodiments of the present disclosure may be implemented or performed. The general-purpose processor may be a microprocessor or the processor may also be any conventional processor, etc. The steps of the method disclosed in conjunction with the embodiments of the present disclosure may be directly embodied as performed by the hardware decode processor or performed with a combination of hardware and software modules in the decode processor. The software module may be in random memory, flash memory, read-only memory, programmable read-only memory or electrically rewritable programmable memory, registers, and other storage medium well established in the art. The storage medium is in the memory and the processor reads information in the memory and completes the steps of the above method in combination with the hardware.

It is to be understood that the memory in embodiments of the present disclosure may be volatile memory or non-volatile memory or may include both volatile and non-volatile memory. Among them, the non-volatile memory may be read-only memory (ROM), programmable ROM (PROM), erasable PROM (EPROM), electrically EPROM (EEPROM), or flash memory. The volatile memory may be random access memory (RAM), which is used as an external cache. By way of illustration, but not limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), and direct Rambus RAM (DR RAM). It should be noted that the memory of the systems and methods described herein are intended to include, but are not limited to, these and any other suitable types of memories.

It is to be understood that the above memories are exemplary but not limiting descriptions, for example, the memory in the embodiments of the present disclosure may also be static RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DR RAM), etc. That is, the memory in the embodiments of the present disclosure is intended to include, but is not limited to, these and any other suitable types of memories.

Embodiments of the present disclosure further provide a computer-readable storage medium for storing a computer program.

In some embodiments, the computer-readable storage medium may be applied to the network device in the embodiments of the present disclosure, and the computer program causes the computer to perform the corresponding processes implemented by the network device in the various methods of embodiments of the present disclosure, which will not be described herein for brevity.

In some embodiments, the computer-readable storage medium may be applied to the mobile terminal/terminal device in the embodiments of the present disclosure, and the computer program causes the computer to perform the corresponding processes implemented by the mobile terminal/terminal device in the various methods of the embodiments of the present disclosure, which will not be repeated herein for the sake of brevity.

Embodiments of the present disclosure further provide a computer program product including a computer program instruction.

In some embodiments, the computer program product may be applied to the network device in the embodiments of the present disclosure, and the computer program instruction causes the computer to perform the corresponding processes implemented by the network device in the respective methods of the embodiments of the present disclosure, which will not be repeated herein for brevity.

In some embodiments, the computer program product may be applied to the mobile terminal/terminal device in the embodiments of the present disclosure, and the computer program instruction causes the computer to perform the corresponding processes implemented by the mobile terminal/terminal device in the respective methods of the embodiments of the present disclosure, which will not be repeated herein for the sake of brevity.

Embodiments of the present disclosure further provide a computer program.

In some embodiments, the computer program may be applied to the network device in the embodiments of the present disclosure, and when the computer program is executed on the computer, the computer program causes the computer to perform the corresponding processes implemented by the network device in the respective methods of the embodiments of the present disclosure, which will not be repeated herein for brevity.

In some embodiments, the computer program may be applied to the mobile terminal/terminal device in the embodiments of the present disclosure, and when the computer program is executed on the computer, the computer program causes the computer to perform the corresponding processes implemented by the mobile terminal/terminal device in the various methods of the embodiments of the present disclosure, which will not be repeated herein for brevity.

Those skilled in the art can realize that the units and algorithmic steps of each example described in conjunction with the embodiments disclosed herein are capable of being implemented as electronic hardware, or a combination of computer software and electronic hardware. Whether these functions are performed in hardware or software depends on particular applications and design constraints of the technical solution. Those skilled in the art may use different methods to implement the described functions for each particular application, but such implementations should not be considered outside the scope of the present disclosure.

It will be clear to those skilled in the art that for the convenience and brevity of the description, the specific working processes of the systems, devices and units described above can be referred to the corresponding processes in the preceding method embodiments and will not be repeated herein.

In several embodiments provided by the present disclosure, it is to be understood that the disclosed systems, devices, and methods, may be implemented in other ways. For example, the embodiments of the devices described above are merely schematic, for example, the division of the units described, which is only a logical functional division, may be divided in other ways when implemented; for example, multiple units or components may be combined or integrated into another system, or some features may be ignored, or not implemented. In addition, the mutual coupling or direct coupling or communication connections shown or discussed may be indirect coupling or communication connections through some interface, device or unit, which can be electrical, mechanical or other forms.

The units illustrated as separate components may or may not be physically separated, and components shown as units may or may not be physical units, i.e., they may be located in one place or may be distributed to a plurality of network units. Some or all of these units may be selected according to practical needs to achieve the purpose of the present disclosure.

In addition, each functional unit in each embodiment of the present disclosure may be integrated in a single processing unit, or each unit may be physically present separately, or two or more units may be integrated in a single unit.

The functions, when implemented as a software functional unit and sold or used as a separate product, may be stored in a computer-readable storage medium. It is understood that the technical solution of the present disclosure, or that part of the technical solution that essentially contributes to the prior art, may be embodied in the form of a software product that is stored in a storage medium and includes a number of instructions to cause a computer device (which may be a personal computer, server, or network device, etc.) to perform all or some of the steps of the method described in various embodiments of the present disclosure. The storage medium includes USB flash drive, removable hard disk, read-only memory (ROM), random access memory (RAM), disk or CD-ROM, and other medium that can store program code.

The foregoing is only a specific implementation of the present disclosure, but the scope of the present disclosure is not limited thereto, and any changes or substitutions that can be readily thought of by those skilled in the art within the scope of the technology disclosed in the present disclosure shall be covered by the scope of the present disclosure. Therefore, the scope of the present disclosure shall be stated to be subject to the scope of the claims.

What is claimed is:

1. A measurement method, comprising:
   receiving, by a terminal device, first indication information sent by a network device; wherein the first indication information is configured to indicate to activate a first measurement gap configuration; and
   determining, by the terminal device, frequency domain information associated with the first measurement gap configuration, and performing, by the terminal device, a measurement based on a measurement configuration and the frequency domain information associated with the first measurement gap configuration,
   wherein the measurement configuration comprises measurement identities associated with measurement object identities corresponding to respective frequency information;
   wherein the frequency domain information comprises at least one of: a frequency point type, a frequency point list, a frequency point and physical cell identity (PCI) list, a frequency band list, and a measurement object identity list associated with the first measurement gap configuration;
   wherein the performing, by the terminal device, a measurement based on a measurement configuration and the frequency domain information associated with the first measurement gap configuration comprises;
   determining that frequency information corresponding to at least one measurement object identity in the measurement configuration is consistent with the frequency domain information associated with the first measurement gap configuration, and performing the measurement on at least one measurement object corresponding to the at least one measurement object identity.

2. The method according to claim 1, wherein the first indication information is carried in a radio resource control (RRC) signaling, or a media access control control element (MAC CE), or a physical downlink control channel (PDCCH).

3. The method according to claim 1, wherein the first indication information is a measurement gap index or a measurement gap pattern identity corresponding to the first measurement gap configuration.

4. The method according to claim 1, further comprising:
   receiving, by the terminal device, first configuration information sent by the network device; wherein the first configuration information is configured to determine at least one measurement gap configuration, and each of the at least one measurement gap configuration is associated with a set of frequency domain information.

5. The method according to claim 1, wherein the performing, by the terminal device, a measurement based on a measurement configuration and the frequency domain information associated with the first measurement gap configuration comprises:
   determining, by the terminal device, whether the frequency point type corresponding to a measurement object is consistent with the frequency point type associated with the first measurement gap configuration according to a measurement object identity associated with a measurement identity in the measurement configuration; and
   performing, by the terminal device, a measurement on the measurement object based on the first measurement gap configuration, in response to the frequency point type corresponding to the measurement object being consistent with the frequency point type associated with the first measurement gap configuration.

6. The method according to claim 1, wherein the performing, by the terminal device, a measurement based on a measurement configuration and the frequency domain information associated with the first measurement gap configuration comprises:
   determining, by the terminal device, whether a frequency point corresponding to a measurement object belongs to the frequency point list associated with the first measurement gap configuration according to a measurement object identity associated with a measurement identity in the measurement configuration; and
   performing, by the terminal device, a measurement on the measurement object based on the first measurement gap configuration, in response to the frequency point corresponding to the measurement object belonging to the frequency point list associated with the first measurement gap configuration.

7. The method according to claim 1, wherein the performing, by the terminal device, a measurement based on a measurement configuration and the frequency domain information associated with the first measurement gap configuration comprises:
determining, by the terminal device, whether a cell corresponding to a measurement object belongs to the frequency point and PCI list associated with the first measurement gap configuration according to a measurement object identity associated with a measurement identity in the measurement configuration; and
performing, by the terminal device, a measurement on the measurement object based on the first measurement gap configuration, in response to the cell corresponding to the measurement object belonging to the frequency point and PCI list associated with the first measurement gap configuration.

8. The method according to claim 1, wherein the performing, by the terminal device, a measurement based on a measurement configuration and the frequency domain information associated with the first measurement gap configuration comprises:
determining, by the terminal device, whether a frequency band in which a frequency point corresponding to a measurement object is located belongs to the frequency band list associated with the first measurement gap configuration according to a measurement object identity associated with a measurement identity in the measurement configuration; and
performing, by the terminal device, a measurement on the measurement object based on the first measurement gap configuration, in response to the frequency band in which the frequency point corresponding to the measurement object is located belonging to the frequency band list associated with the first measurement gap configuration.

9. The method according to claim 1, wherein the performing, by the terminal device, a measurement based on a measurement configuration and the frequency domain information associated with the first measurement gap configuration comprises:
determining, by the terminal device, whether a measurement object identity belongs to the measurement object identity list associated with the first measurement gap configuration according to the measurement object identity associated with a measurement identity in the measurement configuration; and
performing, by the terminal device, a measurement on the measurement object based on the first measurement gap configuration, in response to the measurement object identity belonging to the measurement object identity list associated with the first measurement gap configuration.

10. A measurement method, comprising:
sending, by a network device, first indication information to a terminal device; wherein the first indication information is configured to indicate to activate a first measurement gap configuration, and the first measurement gap configuration is configured for the terminal device to perform a measurement based on a measurement configuration and a frequency domain information associated with the first measurement gap configuration,
wherein the measurement configuration comprises measurement identities associated with measurement object identities corresponding to respective frequency information;
wherein the frequency domain information comprises at least one of: a frequency point type, a frequency point list, a frequency point and physical cell identity (PCI) list, a frequency band list, and a measurement object identity list associated with the first measurement gap configuration;
wherein the measurement is performed on at least one measurement object corresponding to at least one measurement object identity that is in the measurement configuration and corresponds to frequency information consistent with the frequency domain information.

11. The method according to claim 10, wherein the first indication information is carried in a radio resource control (RRC) signaling, or a media access control control element (MAC CE), or a physical downlink control channel (PDCCH).

12. The method according to claim 10, wherein the first indication information is a measurement gap index or a measurement gap pattern identity corresponding to the first measurement gap configuration.

13. The method according to claim 10, further comprising:
sending, by the network device, first configuration information to the terminal device; wherein the first configuration information is configured to determine at least one measurement gap configuration, and each of the at least one measurement gap configuration is associated with a set of frequency domain information.

14. A terminal device, comprising a processor and a memory; wherein the memory is configured to store a computer program, and the processor is configured to call and run the computer program stored in the memory to perform:
receiving, by a terminal device, first indication information sent by a network device; wherein the first indication information is configured to indicate to activate a first measurement gap configuration; and
determining, by the terminal device, frequency domain information associated with the first measurement gap configuration, and performing, by the terminal device, a measurement based on a measurement configuration and the frequency domain information associated with the first measurement gap configuration,
wherein the measurement configuration comprises measurement identities associated with measurement object identities corresponding to respective frequency information;
wherein the frequency domain information comprises at least one of: a frequency point type, a frequency point list, a frequency point and physical cell identity (PCI) list, a frequency band list, and a measurement object identity list associated with the first measurement gap configuration;
wherein the processor is configured to call and run the computer program stored in the memory to perform:
determining that frequency information corresponding to at least one measurement object identity in the measurement configuration is consistent with the frequency domain information associated with the first measurement gap configuration, and performing the measurement on at least one measurement object corresponding to the at least one measurement object identity.

15. The terminal device according to claim 14, wherein the first indication information is carried in a radio resource control (RRC) signaling, or a media access control control element (MAC CE), or a physical downlink control channel (PDCCH).

16. The terminal device according to claim 14, wherein the first indication information is a measurement gap index or a measurement gap pattern identity corresponding to the first measurement gap configuration.

17. The terminal device according to claim 14, the processor is further configured to perform:
   receiving, by the terminal device, first configuration information sent by the network device; wherein the first configuration information is configured to determine at least one measurement gap configuration, and each of the at least one measurement gap configuration is associated with a set of frequency domain information.

* * * * *